United States Patent [19]

Takahashi et al.

[11] 4,152,550
[45] May 1, 1979

[54] APPARATUS FOR REPRODUCING A MULTICHANNEL RECORD DISC

[75] Inventors: Nobuaki Takahashi, Yamato; Fujio Suzuki, Yokohama; Masao Kasuga; Norio Shibata, both of Sagamihara, all of Japan

[73] Assignee: Victor Company of Japan, Ltd., Yokohama, Japan

[21] Appl. No.: 843,856

[22] Filed: Oct. 20, 1977

[30] Foreign Application Priority Data

Oct. 21, 1976 [JP]  Japan .......................... 51-140679[U]
Nov. 24, 1976 [JP]  Japan .......................... 51-157262[U]

[51] Int. Cl.² .......................... G11B 3/74; H03D 3/00
[52] U.S. Cl. .................. 179/100.4 ST; 179/100.1 TD; 179/1 GQ; 179/1 GB
[58] Field of Search .............. 179/100.4 ST, 100.4 M, 179/100.4 A, 100.1 TD, 1 GQ, 15 AT, 100.41 T, 100.41 K, 1 GB; 360/18, 20

[56] References Cited

U.S. PATENT DOCUMENTS

| | | | |
|---|---|---|---|
| 2,562,703 | 7/1951 | Dome | 179/15 BT |
| 3,219,760 | 11/1965 | Loughlin | 179/15 BT |
| 3,431,361 | 3/1969 | Podell | 179/15 BT |
| 3,624,315 | 11/1971 | Broce | 179/100.4 A |
| 3,911,232 | 10/1975 | Itoh | 179/15 BT |
| 3,931,482 | 1/1976 | Sugimoto | 179/15 BT |
| 3,943,303 | 3/1976 | Masuda | 179/100.4 ST |
| 3,944,755 | 3/1976 | Takahashi | 179/100.4 ST |

*Primary Examiner*—Alfred H. Eddleman
*Assistant Examiner*—Alan Faber

[57] ABSTRACT

A multichannel record disc reproducing apparatus has a pickup cartridge for picking up signals from a multichannel record disc. A multiplexed signal was recorded on the disc by first multiplexing direct wave signals and angle-modulated wave signals which are recorded on opposite groove walls. Filters separate the picked up multiplexed signal into the direct wave signal and the angle-modulated wave signal. A demodulates circuit for demodulating the angle-modulated wave signal, thus separated. A matrix circuit separates the signals to obtain a plurality of separate channels from the direct wave signals and the demodulated signals. A circuit in a stage preceding the demodulator removes substantially all components of the higher harmonics at the carrier wave center frequency, which carrier was used for angle-modulating the original signal.

9 Claims, 10 Drawing Figures

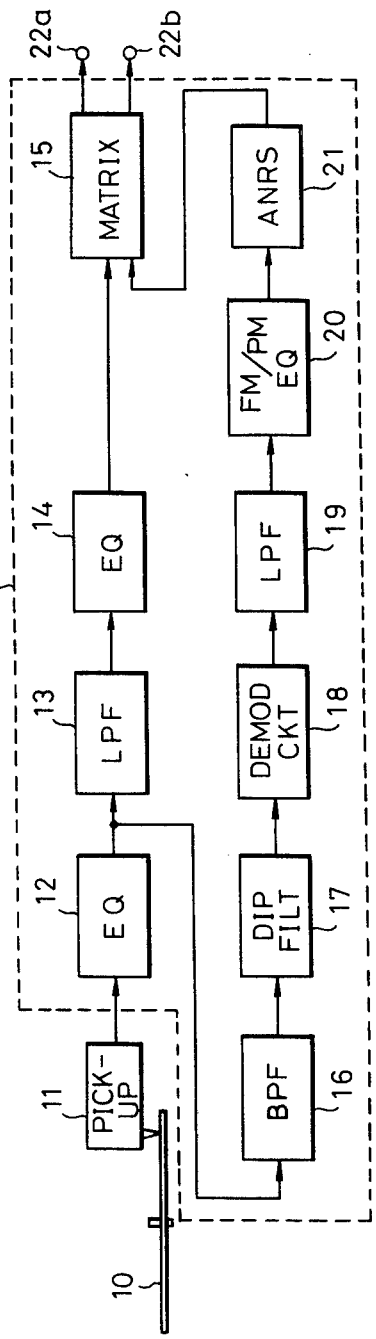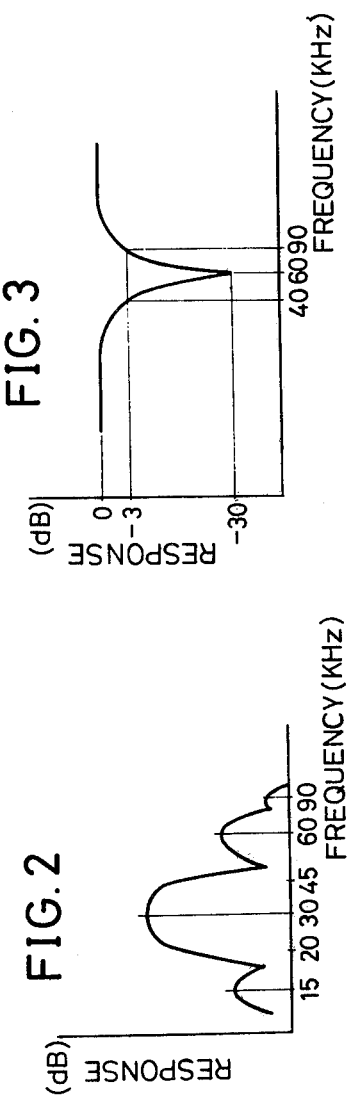

APPARATUS FOR REPRODUCING A MULTICHANNEL RECORD DISC

BACKGROUND OF THE INVENTION

The present invention relates generally to apparatus for reproducing multichannel record discs, and more particularly to apparatus for demodulating and reproducing an angle-modulated wave signal picked up from a multichannel record disc. The higher harmonic components are removed from the carrier wave center frequency, of the angle-modulated wave signal, contained within the picked up signal.

In general, a recording apparatus multiplexes a direct wave signal and an angle-modulated wave signal. The resulting multichannel signal is cut on a record disc. The cutter head used for making this recording has a relatively good crosstalk characteristic between the left and right channels, up to about the upper frequency limit of the angle-modulated signal. For example, a carrier wave center frequency, of the angle-modulated wave signal, may be 30 KHz and a transmission frequency band width may be 20 KHz to 45 KHz. The cutter speed and other variable are so selected that the cross-talk characteristic will be good up to about 45 KHz.

However, this crosstalk characteristic of the cutter head itself is poor. In general, it does not respond well in a frequency band higher than the band upper limit frequency, for example, in a frequency band higher than 50 KHz. For this reason, there often is a crosstalk between the left and right channels. When the higher harmonic components have frequencies which are two, three or more times the center frequency of the carrier wave the angle-modulated signal of one channel may also become recorded in the other channel. That is, in the cited frequency range, components of frequencies such as 60 KHz and 90 KHz are also recorded.

On the other hand, there are pickup cartridges for use in the apparatus which have reproducing characteristics which can reproduce signals of frequency bands up to about 90 KHz. When reproduction is carried out with such a pickup cartridge, even the unwanted frequency components such as 60 KHz and 90 KHz, are picked up.

In the reproducing apparatus, the multiplexed signal of the direct wave signal and the angle-modulated wave signal is picked up and supplied, respectively, to a low-pass filter and a band-pass filter. There, it is separated into the direct wave signal and the angle-modulated wave signal. The angle-modulated wave signal, thus separated, is supplied to a demodulating circuit, where it is demodulated.

In this case, it is necessary for the band-pass filter to have a characteristic which passes angle-modulated wave signals in the 20 KHz to 45 KHz band and to separate them from direct wave signals having frequencies lower than 15 KHz. For this reason, the filtering frequency characteristic has a dip in the vicinity of 18 KHz. In order to obtain a good group delay characteristic, it has a dip in the vicinity of 50 KHz to 52 KHz (or 50 KHz), in a symmetrical relationship to the first dip, also in the high-frequency range. Accordingly, the filtering frequency characteristic of this band-pass filter has side lobes at frequency positions such as 15 KHz, 60 KHz, and 90 KHz.

The unwanted frequency components of 60 KHz, 90 KHz, etc., produced by the crosstalk were recorded and, therefore, are contained in the picked up signal. These signals are attenuated to a certain level by the side lobe characteristic of the band-pass filter. They are passed and supplied to the demodulating circuit. At present, however, a phase locked loop (PLL) is generally used for demodulating the signals picked up from a multichannel record disc reproducing apparatus. Since this PLL is capable of detecting these frequency components 60 KHz, 90 KHz, etc., they influence the other channels as crosstalk. Consequently, when such frequency components of 60 KHz, 90 KHz, etc., are supplied to the demodulating circuit, beats are generated between these frequency components and the carrier wave center frequency of 30 KHz of the angle-modulated signal. A distortion, due to interference, is produced in the demodulated output, whereby an abnormal sound is generated.

SUMMARY OF THE INVENTION

Accordingly, it is a general object of the present invention to provide a novel and useful multichannel record disc reproducing apparatus in which the above described difficulties have been overcome.

Another and specific object of the invention is to provide a multichannel record disc reproducing apparatus for removing the higher harmonic frequency components of the carrier wave center frequency of the angle-modulated wave signal, from a signal picked up from a multichannel record disc. Then, demodulation is carried out. In the apparatus according to the invention, a reproduced signal can be satisfactorily obtained without the generation of abnormal sound due to interference distortion even when unwanted frequency components are recorded by crosstalk in the recording apparatus.

Still another object of the invention is to provide a multichannel disc reproducing apparatus in which a band elimination filter, dip filter, or a trap circuit is provided in the demodulator for removing the higher harmonic components of the carrier wave center frequency of the angle-modulated wave signal.

A further object of the invention is to provide a multichannel disc reproducing apparatus in which a band elimination filter, a dip filter, or a trap circuit is provided within the pickup cartridge or within an adapter connected to the record player for removing the higher harmonic components of the carrier wave center frequency of the angle-modulated wave signal.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 1 is a block diagram of a first embodiment of the multichannel record disc reproducing apparatus according to the present invention;

FIG. 2 is a graph indicating the filtering frequency characteristic of a band-pass filter in the apparatus illustrated in FIG. 1;

FIG. 3 is a graph indicating a frequency characteristic of a dip filter in the apparatus shown in FIG. 1;

DETAILED DESCRIPTION

Figure 4:
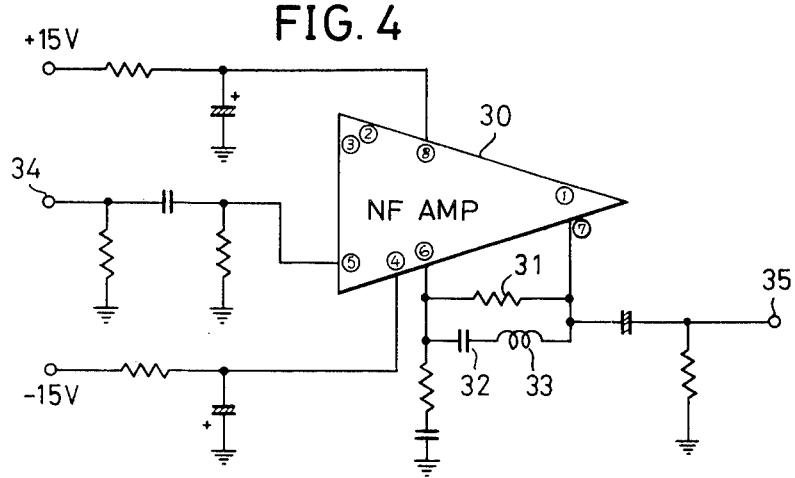
FIG. 4 is a circuit diagram of a specific circuit for obtaining a dip filter characteristic.

FIGS. 1 through 5 show a first embodiment of the invention. In FIG. 1, a multiplexed signal, comprising a direct wave sum signal and an angle-modulated difference signal, for each pair of two channels, is recorded on each side wall of the sound groove of a four-channel record disc 10, as is well-known. A total of four channels are thus recorded. A pickup cartridge 11 picks up one pair of multiplexed signals comprising the direct wave sum signal and the angle-modulated wave difference signal, from the left wall of the grooves of the disc 10. The picked up signal is fed to an equalizer 12 in a demodulator 23, having an RIAA (Recording Industry Association of America) turnover characteristic.

The resulting signal is fed from the equalizer 12 to a low-pass filter 13 for eliminating the angle-modulated wave component and for deriving only the direct wave sum signal component. The direct wave sum signal is fed to a matrix circuit 15, via an equalizer 14 having the RIAA roll-off characteristic.

The output of the equalizer 12 is partly fed to a band-pass filter 16 (or high-pass filter) having a passband in the approximate range of 20 KHz to 45 KHz. An angle-modulated wave difference signal is derived from this filter. For demodulation, the angle-modulated wave difference signal is fed to a demodulation circuit 18, via a band elimination filter or trap circuit or dip filter 17, which will be described in detail hereinafter.

The demodulated output from the demodulation circuit 18 is supplied to a low-pass filter 19. There the unwanted components are eliminated from the demodulated output. The output is fed from the low-pass filter 19 to the matrix circuit 15 via (in succession) an FM/PM equalizer 20 and an automatic noise reduction system (ANRS) circuit 21 comprising an expandor. The characteristic of the expandor compensates for the characteristic of a compressor (not shown) in the recording system.

The matrix circuit 15 combines the direct wave sum signal from the equalizer 14 and the demodulated difference signal from the ANRS circuit 21. From output terminals 22a and 22b are derived, for instance, the left front (the first channel) and the left rear (the second channel) signals, respectively.

FIG. 1 shows only the circuit system for processing the first and second channel signals (the signals recorded on the left wall of the grooves of the disc 10). Exactly the same type of system is duplicated for the right front (the third) and the right rear (the fourth) channel. A detailed illustration and description of this right system are omitted herein.

Here, the dip filter 17 constitutes an essential part of the system of the present invention. The dip filter 17 will now be described.

As mentioned hereinbefore and as indicated in FIG. 2, the band-pass filter 16 possesses its original band-pass filtering characteristic of passing signals in the band of 20 KHz to 45 KHz. In addition, it has side lobes with centers at 15 KHz, 60 KHz, 90 KHz, etc. The frequency components of 60 KHz and 90 KHz are two, three, or more times the carrier center frequency of 30 KHz of the angle-modulated wave. In the recording apparatus, these components are present because there is crosstalk between the left and right channels. These components are also passed by the side lobe characteristic.

Accordingly, in the present embodiment of the invention, the dip filter 17 has the characteristic indicated in FIG. 3, with a dip at 60 KHz. Filter 17 is provided in front of the demodulating circuit 18. By this provision, the unwanted frequency component of 60 KHz, which has passed through the band-pass filter 16, is greatly attenuated by the dip filter 17, and is almost completely blocked from the demodulating circuit 18. Therefore, interference distortion is elminated from the demodulated output. This distortion is due to a modulation of the angle-modulated wave signal by the frequency of the beats generated between the carrier wave signals of 60 KHz and 30 KHz.

The frequency component of 90 KHz is greatly attenuated in the band-pass filter 16, as is apparent from the characteristic indicated in FIG. 2. The desired results can be achieved in actual practice by providing only the dip filter 17 of 60 KHz, without providing another dip filter of 90 KHz. Depending on the necessity, however, a dip filter having a dip at 90 KHz may be further provided in addition to the dip filter 17 of 60 KHz.

In the present embodiment of the invention, the dip filter 17 is provided between the band-pass filter 16 and the demodulating circuit 18. It may also be provided in a stage in front of the band-pass filer 16.

The frequency eliminating band of the dip filter 17 may be a frequency band having a width of the order in $\pm 5$ percent to $\pm 10$ percent of the dip center frequency (60 KHz in the present embodiment of the invention).

A specific example of a circuit for obtaining a characteristic which is substantially the same as that of the dip filter 17 will now be described, with reference to FIG. 4. A circuit comprising a resistor 31, a capacitor 32, and a coil 33 passes signals of the frequency 60 KHz. This circuit is connected in the negative feedback circuit between terminal pins ⑦ and ⑥ of an amplifier 30, in the form of an integrated circuit. Accordingly, when a signal is supplied from the band-pass filter 16 through an input terminal 34, its frequency component of 60 KHz is attenuated in the negative feedback amplifier 30. The resulting output signal is led out an output terminal 35 and supplied to the demodulating circuit 18.

Figure 5:
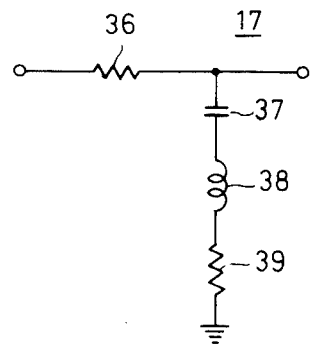
FIG. 5 is a circuit diagram of one example of a dip filter.

One example of a circuit for the dip filter 17, as illustrated in FIG. 5, comprises a resistor 36, a capacitor 37, a coil 38, and a resistor 39, connected as shown. The resistor 39 is the resistance value of the coil 38. One example of specific constants for these components in this dip filter is as follows.

Figure 6:
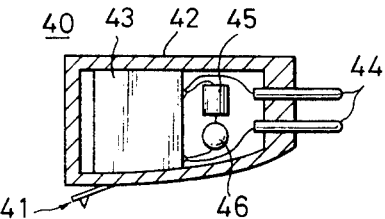
FIG. 6 is a side view, partly in longitudinal section, showing a pickup cartridge of a second embodiment of the multichannel record disc reproducing apparatus, according to the invention.
Figure 7:
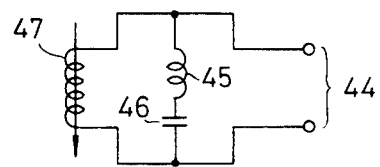
FIG. 7 is an equivalent circuit diagram of the pickup cartridge shown in FIG. 6.

Resistances —
  Resistor 36: 6.8 K$\Omega$; Resistor 39: 100$\Omega$
Capacitance —
  Capacitor 37: 680 PF
Inductance —
  Coil 38: 10 mH Next, a pickup cartridge in the second embodiment of the invention will be described with reference to FIGS. 6, 7, and 8. This pickup cartridge 40 has a stylus assembly 41 comprising a stylus, a cantilever spring, and other parts, and a transducer 43 installed within the casing 42. The pickup cartridge 40 converts mechanical vibrations into an electrical signal. Terminal pins 44 are connected to the transducer 43 and extend out of the casing 42. A coil 45 and a capacitor 46 are both enclosed within the casing 42.

In the present embodiment of the pickup cartridge, the coil 45 and the capacitor 46 are mutually connected in series. This series combination is further connected in parallel to a pickup coil 47, as shown in the equivalent circuit of the diagram in FIG. 7. The coil 45 and the capacitor 46 constitute a trap circuit and have a characteristic with a dip at 60 KHz.

Figure 8:
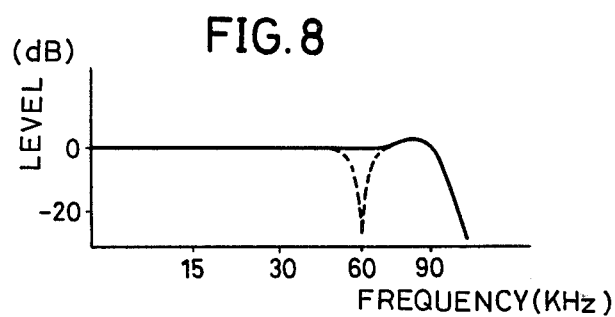
FIG. 8 is a graph indicating a frequency characteristic of the pickup cartridge shown in FIG. 6.

If this trap circuit does not exist, the original pickup frequency characteristic is as indicated by full line in FIG. 8. However, the pickup cartridge of the present embodiment has a built-in trap circuit comprising the coil 45 and the capacitor 46. The frequency characteristic thereof becomes as indicated by broken line in FIG. 8 at 60 KHz and the vicinity thereof.

A picked up signal from which the 60 KHz frequency component has been removed is led out through the terminal pins 44 of the pickup cartridge 40 and supplied to a demodulator of known type. This known demodulator corresponds to the demodulator 23 illustrated in FIG. 1 without the dip filter 17.

The component of a frequency equal to twice the carrier wave center frequency is removed from the picked up signal in the present embodiment of the invention. This is an effectiveness equivalent to that of the first embodiment of the invention.

Figure 9:
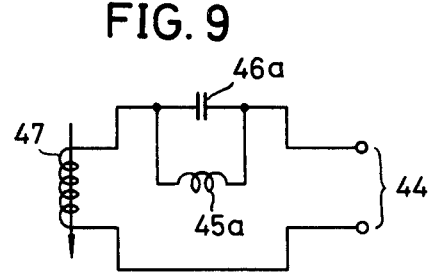
FIG. 9 is an equivalent circuit diagram of a modification of the pickup cartridge.

The second embodiment of the invention may be modified as illustrated by FIG. 9. In this circuit, a coil 45a and a capacitor 46a constituting a trap circuit are mutually connected in parallel. This parallel combination is connected in series to the pickup coil 47. The frequency characteristic of this trap circuit also imparts a dip at 60 KHz.

Figure 10:
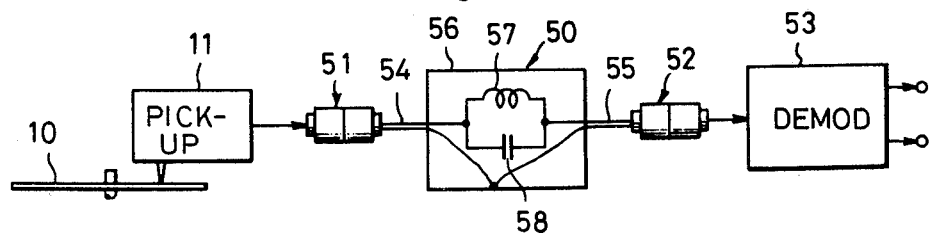
FIG. 10 is a general schematic diagram of a third embodiment of the multichannel record disc reproducing apparatus, according to the present invention.

A third embodiment of the invention will now be described in conjunction with FIG. 10. An adapter 50 is connected by a plug and jack 51 through a cord 54 to a record player including a pickup cartridge 11 and by a plug and jack 52 through a cord 55 to a demodulator 53. This demodulator 53 is a known type, which is equivalent to the demodulator shown in FIG. 1, without the dip filter 17.

The adapter 50 has a casing 56 within which is installed a parallel connected combination of a coil 57 and a capacitor 58, connected to the cords 54 and 55. The coil 57 and the capacitor 58 constitute a trap circuit having a dip at 60 KHz. Accordingly, the adapter 50 removes a 60 KHz frequency component from a signal picked up and reproduced by the pickup cartridge 11. The resulting signal is then supplied to the demodulator 53.

In the present embodiment of the invention, it is sufficient merely to interpose and connect the adapter 50 between the record player and the demodulator. There is no necessity of using a special demodulator or a special pickup cartridge, as in the preceding first and second embodiments of the invention. Accordingly, the present embodiment of the invention is readily applicable to a multichannel record disc reproducing apparatus in which a conventional record player and a conventional demodulator are employed thereby to readily modify and convert the apparatus to achieve the objects of this invention.

Further, this invention is not limited to these embodiments. Variations and modifications may be made without departing from the scope and spirit of the invention.

What is claimed is:

1. A multichannel record disc reproducing apparatus comprising:

multichannel pickup means for reproducing a multiplexed signal including a direct wave signal and an angle-modulated wave signal recorded on a disc;

means for separating the picked up multiplexed signal into the direct wave signal and the angle-modulated wave signal;

means for demodulating the separated angle-modulated wave signal;

means for reconstituting signals of a plurality of separate channels from the separated direct wave signal and the demodulated signal; and means in a stage preceding the demodulating means for substantially removing the higher harmonic components of the carrier wave center frequency of the angle-modulated wave signal.

2. A multichannel record disc reproducing apparatus as claimed in claim 1 in which said separating means comprises a low-pass filter means for separating the direct wave signal and a band-pass filter means for separating the angle-modulated wave signal; said band-pass filter means having a band-pass characteristic for passing the angle-modulated wave signal and a side lobe characteristic at the positions of the higher harmonic frequencies of the carrier wave center frequency of the angle-modulated wave signal; said means for removing said higher harmonics being in a path for transmitting the angle-modulated wave signal through the band-pass filter.

3. A multichannel record disc reproducing apparatus as claimed in claim 1 in which said means for removing said higher harmonics comprises means for substantially removing the frequency component which is two times the carrier wave center frequency.

4. A multichannel record disc reproducing apparatus as claimed in claim 1 in which said means for removing said higher harmonics comprises a dip filter having a filtering characteristic with a dip at the higher harmonic frequency of the carrier wave center frequency of the angle-modulated wave signal.

5. A multichannel record disc reproducing apparatus as claimed in claim 1 in which said means for removing said higher harmonics comprises a band elimination filter having a characteristic for eliminating the higher harmonic frequency component of the carrier wave center frequency of the angle-modulated wave signal.

6. A multichannel record disc reproducing apparatus as claimed in claim 1 in which said means for removing said higher harmonics comprises a trap circuit having a characteristic with a trap at the higher harmonic frequency of the carrier wave center frequency of the angle-modulated wave signal.

7. A multichannel record disc reproducing apparatus as claimed in claim 1 in which said means for removing said higher harmonics comprises a negative feedback amplifier having a circuit for passing the higher harmonic frequency component of the carrier wave center frequency of the angle-modulated wave signal provided in a negative feedback circuit thereof.

8. A multichannel record disc reproducing apparatus as claimed in claim 1 in which said pickup means comprises a pickup cartridge having a casing; and said means for removing said higher harmonics is installed in said casing of the pickup cartridge.

9. A multichannel record disc reproducing apparatus as claimed in claim 1 in which said reproducing apparatus comprises a record player including said pickup means, and demodulator means comprising said separating means, said demodulating means, and said signal reconstituting means, said means for removing said higher harmonics being an adaptor connected between said record player and said demodulator.

* * * * *